US007626505B2

(12) United States Patent  (10) Patent No.: US 7,626,505 B2
August et al.  (45) Date of Patent: Dec. 1, 2009

(54) RF TAGS FOR TRACKING AND LOCATING TRAVEL BAGS

(75) Inventors: Jason August, Toronto (CA); Paul Waterhouse, Selkirk (CA); John K. Stevens, Stratham, NH (US)

(73) Assignee: Visible Assets, Inc, Mississauga (CA)

( * ) Notice: Subject to any disclaimer, the term of this patent is extended or adjusted under 35 U.S.C. 154(b) by 296 days.

(21) Appl. No.: 11/162,907

(22) Filed: Sep. 28, 2005

(65) Prior Publication Data
US 2006/0220857 A1  Oct. 5, 2006

Related U.S. Application Data

(60) Provisional application No. 60/613,767, filed on Sep. 28, 2004.

(51) Int. Cl.
*G08B 13/14*  (2006.01)
(52) U.S. Cl. ............... 340/572.4; 340/572.1; 340/568.1
(58) Field of Classification Search ............... 340/572.1, 340/572.4, 572.7, 573.1, 568.1, 539.1, 539.13, 340/5.7, 10.1, 10.2, 539.11; 235/383, 492; 701/16; 714/749
See application file for complete search history.

(56) References Cited

U.S. PATENT DOCUMENTS

| | | | |
|---|---|---|---|
| 4,792,796 A | 12/1988 | Bradshaw et al. | |
| 4,821,291 A | 4/1989 | Stevens et al. | |
| 4,879,756 A | 11/1989 | Stevens et al. | |
| 4,937,586 A | 6/1990 | Stevens et al. | |
| 5,177,432 A | 1/1993 | Waterhouse et al. | |
| 5,245,534 A | 9/1993 | Waterhouse et al. | |
| 5,260,694 A | 11/1993 | Remahl | |
| 5,374,815 A | 12/1994 | Waterhouse et al. | |
| 5,532,465 A | 7/1996 | Waterhouse et al. | |
| 5,920,576 A * | 7/1999 | Eaton et al. | 714/749 |
| 6,027,027 A | 2/2000 | Smithgall | |

(Continued)

FOREIGN PATENT DOCUMENTS

WO  9608760  3/1996

(Continued)

OTHER PUBLICATIONS

Lindsay, Jeffrey et al. "Cascading RFID Tags", Dec. 23, 2003, pp. 1-10, West Henrietta, NY.

*Primary Examiner*—Van T. Trieu
(74) *Attorney, Agent, or Firm*—Larson & Anderson LLC

(57) ABSTRACT

A method, system and RF tag for tracking and locating travel bags during their shipment (e.g. by airlines) by providing owner's identification, destination, historical, and other pedigree information about such shipped travel bags. The RF travel tags are active (e.g. battery or solar cell powered), operate at low radio frequencies, below 15 MHz (e.g. 128 kHz), and comprise a large storage device which stores information. The stored information comprises both identification information that identifies said travel bag and an owner (e.g. name, address) thereof and database information concerning characteristics of the travel bag, the database information including the destination, origin, travel history of the bag, and historical characteristics of said travel bag. The RF travel bag tag has a first loop antenna, a transceiver operatively connected with the first antenna and operable to receive a first RF interrogation signal at a low frequency not exceeding 15 MHz (e.g. 128 kHz) from a first reader and to transmit RF signals in response.

24 Claims, 5 Drawing Sheets

U.S. PATENT DOCUMENTS

| | | | |
|---|---|---|---|
| 6,127,917 | A | 10/2000 | Tuttle |
| 6,164,551 | A | 12/2000 | Altwasser |
| 6,208,235 | B1 | 3/2001 | Trontelj |
| 6,222,452 | B1 | 4/2001 | Ahlstrom et al. |
| 6,335,688 | B1 | 1/2002 | Sweatte |
| 6,624,752 | B2 | 9/2003 | Klitsgaard et al. |
| 6,662,078 | B1 | 12/2003 | Hardgrave et al. |
| 6,696,954 | B2 | 2/2004 | Chung |
| 6,724,308 | B2 * | 4/2004 | Nicholson ............... 340/572.1 |
| 7,028,861 | B2 | 4/2006 | Sayers et al. |
| 7,049,963 | B2 | 5/2006 | Waterhouse et al. |
| 7,193,515 | B1 * | 3/2007 | Roberts et al. ........... 340/568.1 |
| 7,242,301 | B2 * | 7/2007 | August et al. ............ 340/572.1 |
| 2001/0048361 | A1 | 12/2001 | Mays et al. |
| 2002/0041235 | A1 | 4/2002 | Van Horn et al. |
| 2003/0055689 | A1 * | 3/2003 | Block et al. .................... 705/5 |
| 2004/0053641 | A1 | 3/2004 | Leung et al. |
| 2004/0066366 | A1 * | 4/2004 | Jung et al. ................. 345/156 |
| 2004/0069849 | A1 | 4/2004 | Stevens et al. |
| 2004/0134620 | A1 | 7/2004 | Soeborg |
| 2004/0149822 | A1 | 8/2004 | Stevens et al. |
| 2004/0205350 | A1 | 10/2004 | Waterhouse et al. |
| 2005/0029345 | A1 | 2/2005 | Waterhouse et al. |
| 2005/0043850 | A1 | 2/2005 | Stevens et al. |
| 2005/0043886 | A1 | 2/2005 | Stevens et al. |
| 2005/0083213 | A1 | 4/2005 | Stevens et al. |
| 2005/0086983 | A1 | 4/2005 | Stevens et al. |
| 2005/0149226 | A1 | 7/2005 | Stevens et al. |
| 2005/0205817 | A1 | 9/2005 | Marcichow et al. |
| 2005/0251330 | A1 | 11/2005 | Waterhouse et al. |
| 2006/0124662 | A1 | 6/2006 | Reynolds et al. |
| 2006/0128023 | A1 | 6/2006 | Waterhouse et al. |
| 2006/0164232 | A1 | 7/2006 | Waterhouse et al. |
| 2006/0232417 | A1 | 10/2006 | August et al. |

FOREIGN PATENT DOCUMENTS

| | | |
|---|---|---|
| WO | 02071382 | 9/2002 |

* cited by examiner

RF TAGS FOR TRACKING AND LOCATING TRAVEL BAGS

CROSS-REFERENCE TO RELATED APPLICATIONS

This application claims priority from U.S. application No. 60/613,767 filed Sep. 28, 2004, which application is incorporated herein by reference for all purposes.

FIELD OF THE INVENTION

The present invention relates to radio frequency tags, methods, and systems for tracking and locating travel bags for the airline and other travel industries, and to readily provide pedigree information about the bags and their owners.

BACKGROUND OF THE INVENTION

Much of the RF-ID focus within the airline industry has been to create a, low cost, passive RF tag system to replace existing Barcodes. These tags are placed on bags upon check-in and would provide enhanced rapid sorting as well as improved identity of the bags. These tags would be used once and have a pre-assigned fixed ID.

Some disadvantages of this prior art passive tag approach are

Attaching a fragile chip through existing print and apply methods along with the rough handling typical within airports. Many of the problems found to date during pilot tests of such tags has involved damage and breakage of the tag during baggage transfer on conveyors.

Major new IT (Information Technology) cost to track and identify the new fixed unique ID of the tags for each use. This also leads to costly new security issues and expensive access issues to any information contained within the remotely stored database.

No ability to provide detailed bag pedigree (e.g. owner ID and/or history of bag). Moreover, only limited data can be captured and stored on the prior art tags.

Since passive tags must be low cost and disposable, they also must be UHF (ultra high frequency) and as a result can only be read with expensive proximity readers that do not work well around nearby materials such as steel or liquids and thus cannot be networked effectively. Thus, such high frequency tags cannot provide real time inventory in plane or in airport storage areas, which typically have a great deal of such high-radio-frequency-interfering materials.

For example if a TSA (Transportation Security Administration) search of the bag is necessary, the TSA employee will require an expensive handheld reader, that can rapidly access the database to obtain any information about the owner of the bag. A typical reader that would provide this information would currently cost about $5,000.00/unit. In addition, any record that the bag has been searched would also have to be entered, at considerable cost, into this database. The bag information—a fragmented pedigree, must then be stored in a remote server, and would be accessible only through expensive access systems.

Additionally, once the bag is placed into the belly (the on-board storage, or "hold") of the plane, the bag still must be removed and read in time to identify the owner. For example if, for any reason, a passenger, who has checked bags on a plane, does not actually board, the procedure for removal of bags in order to check individual bags still is largely a time-consuming and expensive manual process. Moreover, if a bag is misrouted or misplaced, identifying or locating these lost bags is again a largely manual process.

The sorting problem and bar code replacement solution using passive RF ID tags is largely based on antiquated systems approaches that in some cases may, in themselves, actually reduce security (e.g. because of confusion during sorting and location of misplaced bags) and make it difficult to provide a full interactive real-time pedigree.

SUMMARY OF THE INVENTION

The present invention makes advantageous use of a radio frequency (RF) tag which is provided with a fully programmable ID and which is operable to store a pedigree information about travel bags during shipment (e.g. on a pallet, in a baggage storage room, in the belly of an airplane, rail car, sea vessel or the like), and may advantageously store other information that might normally be stored only in a data base that is external to the RF tag. According to the invention, the data storage device (e.g. memory) of the RF tag stores all "pedigree" information required to identify a travel bag and its owner, as well as other information such as where the travel bag has been in its history as well as its next shipping destination.

The present invention also functions as a novel system to overcome the prior art requirement for an external searchable database by providing data and information stored in the memory of the RF tag attached to the product and is thus stored at all times with the bag, so that no additional data transfer is required. All information required to track the freight within an airport baggage room or in the hold of an airplane may then be carried in a hierarchy of RF tags (e.g. attached to individual luggage bags, to pallets/ULD's that hold many tagged bags, and to a larger repository (e.g. belly/hold of airplane, or baggage warehouse) which holds object-bearing pallets; the memories of all these nested RF tags can be read and searched without any external access to data or databases. Advantageously, first level pallet RF tags can read travel bag RF tags, and higher level baggage room or airplane hold RF tags can read first level tags. Moreover, the invention provides for immediate transmission of such read data to an unalterable store (e.g. via satellite to a remote write-once-only CD recorder).

The invention thus also provides a method and system for obtaining complete nested identification, destination, and historical information about shipped travel bags, the contents of pallets/ULD's upon which the travel bags are disposed, and the contents of airplanes and other higher level repositories in which the pallets are disposed without requiring access to external databases to obtain the information. For this purpose, the travel bags, first level pallets/ULD's, and higher level repositories/airplanes carry RF tags (sometimes called "RF SQL" tags-radio frequency structured query language tags) which contain a storage device to store identification information about the travel bag, pallet, or higher level repository to which they are attached. Moreover, RF SQL tags that are to be attached to product travel bags also store destination and historical information about the travel bag, while pallet and higher level repository RF SQL tags store identification information about the travel bags then disposed on the pallet and the pallets disposed in the airplane or other higher level repository, respectively.

Broadly and generally, the present invention provides a method for accessing information about a travel bag during shipment thereof (e.g. via airline), the aforesaid method comprising the steps of:

a) associating a radio frequency (RF) travel bag tag with said travel bag, the aforesaid travel bag RF tag comprising a storage device operable to store information, the stored information comprising both identification information that identifies the aforesaid travel bag and an owner (e.g. name, address) thereof and database information concerning characteristics of the travel bag, the aforesaid database information being selected from information concerning the destination, origin, travel history of bag, and historical characteristics of said travel bag, the aforesaid RF travel bag tag further comprising a first loop antenna, a transceiver operatively connected with the aforesaid first loop antenna and operable to receive a first RF interrogation signal at a low frequency not exceeding 15 MHz (e.g. 128 kHz) from a first reader and to transmit RF signals in response thereto, a microprocessor operable to control data flow between said data storage device and said transceiver in response to said RF interrogation signal, and an energy storage device for providing energy to said transceiver, data storage device, and said microprocessor;

b) interrogating the aforesaid RF travel bag tag with said RF interrogation signal from the aforesaid first reader to obtain the aforesaid stored information.

According to another preferred embodiment, the method comprises the step of: c) transmitting the aforesaid RF signals (e.g. by cable or by high frequency RF) from the aforesaid transceiver at step (a) to a central monitoring station for auditable recording thereat (e.g. on a write-once-only CD).

Preferably, the aforesaid RF travel bag tag further comprising a display (e.g. LCD) for displaying a selection of the aforesaid stored ID and pedigree information upon carrying out interrogation step (b). Moreover, the aforesaid RF travel bag tag preferably further comprises an indicator device (e.g. an LED) operable to provide an indication (e.g. flashing light, buzzing sound) in response to interrogation of the RF travel bag tag upon carrying out interrogation step (b) by using the aforesaid first RF interrogation signal.

According to a preferred embodiment, the aforesaid travel bag may be disposed at a first level repository (e.g. pallet or ULD—an airline Unit Load Device), the aforesaid method then further comprising a step of associating a first level RF tag with the aforesaid first level repository, the aforesaid first level RF tag comprising a first level data storage device operable to store first level information, the first level stored information comprising both first level identification information that identifies the aforesaid first level repository (e.g. ULD) and the aforesaid travel bag disposed thereat and first level database information concerning characteristics of the aforesaid first level repository, the aforesaid first level database information being selected from information concerning the destination, origin, and historical characteristics of said first level repository, the aforesaid first level RF tag further comprising a second loop antenna, a second transceiver operatively connected to said second antenna and operable to receive a second RF interrogation signal at a low frequency not exceeding 15 MHz (e.g. 128 kHz) from a second reader and to transmit RF signals in response thereto, a first level microprocessor operable to control data flow between the aforesaid first level data storage device and the aforesaid second transceiver in response to the aforesaid second RF interrogation signal, and an energy source (e.g. battery, solar cell, transponder, directly connected external power) for providing energy to the aforesaid second transceiver, first level data storage device, and first level microprocessor;

b) interrogating the aforesaid first level RF tag with the aforesaid second interrogation signal from the aforesaid second reader to obtain the aforesaid first level stored information.

According to a another embodiment in which the aforesaid travel bag is disposed at a first level repository (e.g. pallet/ULD), and the aforesaid first level repository is disposed at a higher level repository (e.g. airplane, warehouse baggage room), the novel method further comprises a step of associating (e.g. attaching) a higher level RF tag with the aforesaid higher level repository (e.g. airplane), the aforesaid higher level RF tag serving as the aforesaid second reader and comprising a higher level data storage device operable to store higher level information, the stored higher level information comprising both identification information that identifies the aforesaid higher level repository (e.g. airplane) and the aforesaid first level repository (e.g. ULD) stored thereat and database information concerning characteristics of the aforesaid higher level repository, the aforesaid database information being selected from information concerning the destination, origin, and historical characteristics of the aforesaid higher level repository, the aforesaid higher level RF tag further comprising a third loop antenna, a third transceiver operatively connected to the aforesaid third loop antenna and operable to transmit the aforesaid second RF interrogation signal at the aforesaid low frequency (below 15 MHz) to the aforesaid first level RF tag, a higher level microprocessor operable to control data flow between the aforesaid higher level data storage device and the aforesaid third transceiver, and an energy source (e.g. battery, solar cell, transponder, directly connected external power) for providing energy to the aforesaid third transceiver, higher level data storage device, and higher level microprocessor.

Preferably, the aforesaid second reader being in operative communication with a central monitoring station (e.g. via the internet from the second reader's IP address).

According to another preferred embodiment, the method comprises the step of: c) transmitting the aforesaid RF signals (e.g. by cable or by high frequency RF) from the aforesaid transceiver at step (a) to a central monitoring station for auditable recording thereat (e.g. on a write-once-only CD).

The invention also provides a system for accessing information about a travel bag during shipment thereof (e.g. via airline). The aforesaid system comprises:

a) a radio frequency (RF) travel bag tag associated with the aforesaid travel bag, the aforesaid travel bag RF tag comprising a travel bag data storage device operable to store information, the stored information comprising both identification information that identifies the aforesaid travel bag and an owner (e.g. name, address) thereof and database information concerning characteristics of the travel bag, the aforesaid database information being selected from information concerning the destination, origin, travel history of bag, and historical characteristics of the aforesaid travel bag, the aforesaid RF travel bag tag further comprising a first loop antenna, a transceiver operatively connected with the aforesaid first antenna and operable to receive a first RF interrogation signal at a low frequency not exceeding 15 MHz (e.g. 128 kHz) from a first reader and to transmit RF signals in response thereto, a microprocessor operable to control data flow between the aforesaid data storage device and the aforesaid transceiver in response to the aforesaid RF interrogation signal, and an energy storage device for providing energy to the aforesaid transceiver, data storage device, and microprocessor;

b) an aforesaid first reader interrogating the aforesaid RF travel bag tag with the aforesaid first RF interrogation signal from to obtain the aforesaid stored information.

Preferably, the aforesaid RF travel bag tag further comprises a display (e.g. LCD) for displaying a selection of the aforesaid stored information upon carrying out interrogation step (b). Advantageously, the aforesaid RF travel bag tag may further comprise an indicator device (e.g. an LED) operable to provide an indication (e.g. flashing light, buzzing sound) in response to interrogation of the aforesaid RF travel bag tag upon carrying out interrogation step (b) by using the aforesaid first RF interrogation signal.

According to a preferred embodiment of the novel system, the aforesaid travel bag is disposed at a first level repository (e.g. pallet/ULD), the aforesaid first level RF tag being associated with (e.g. attached to) the aforesaid first level repository, the aforesaid first level RF tag comprising a first level data storage device operable to store first level information, the first level stored information comprising both first level identification information that identifies the aforesaid first level repository and the aforesaid travel bag disposed thereat and first level database information concerning characteristics of the aforesaid first level repository. The aforesaid first level database information is selected from information concerning the destination, origin, and historical characteristics of the aforesaid first level repository. The aforesaid first level RF tag further comprises a second loop antenna, a second transceiver operatively connected to the aforesaid second antenna and operable to receive a second RF interrogation signal at a low frequency not exceeding 15 MHz (e.g. 128 kHz) from a second reader and to transmit RF signals in response thereto, a first level microprocessor operable to control data flow between said first level data storage device and the aforesaid second transceiver in response to the aforesaid second RF interrogation signal, and an energy source (e.g. battery, solar cell, transponder, directly connected external power) for providing energy to said second transceiver, first level data storage device, and first level microprocessor;

b) an aforesaid second reader operable for interrogating the aforesaid first level RF tag with the aforesaid second interrogation signal to obtain the aforesaid first level stored information.

According to another embodiment of the novel system, the aforesaid travel bag is disposed at a first level repository (e.g. pallet/ULD) which is disposed at a higher level repository (e.g. airplane, warehouse baggage room), the aforesaid system further comprising a higher level RF tag associated with the aforesaid higher level repository, the aforesaid higher level RF tag serving as the aforesaid second reader and comprising a higher level data storage device operable to store higher level information. The stored higher level information comprises both identification information that identifies the aforesaid higher level repository (e.g. airplane, flight number) and the aforesaid first level repository (e.g. ULD) stored thereat and database information concerning characteristics of the aforesaid higher level repository, the aforesaid database information being selected from information concerning the destination, origin, and historical characteristics (e.g. most recent flights) of the aforesaid higher level repository. The aforesaid higher level RF tag further comprises a third loop antenna, a third transceiver operatively connected to the aforesaid third loop antenna and operable to transmit the aforesaid second RF interrogation signal at the aforesaid low frequency to the aforesaid first level RF tag, a higher level microprocessor operable to control data flow between the aforesaid higher level data storage device and said third transceiver, and an energy source (e.g. battery, solar cell, transponder, directly connected external power) for providing energy to the aforesaid third transceiver, higher level data storage device, and higher level microprocessor. Preferably, the aforesaid second reader is in operative communication, as by a satellite link from an on-board server, with a central monitoring station (e.g. via the internet from the second reader's IP address). The communicated data is preferably recorded on a remote write-once-only CD or other data storage device which is available for audit by the TSA, the airline, as well as the bag owner.

For use in a system for accessing information about a travel bag during shipment (e.g. via airline) thereof, the present invention also provides a radio frequency (RF) travel bag tag operable to be associated with the aforesaid travel bag, the aforesaid RF travel bag tag comprising a data storage device operable to store information, the stored information comprising both identification information that identifies the aforesaid travel bag and database information concerning characteristics of the aforesaid travel bag. The aforesaid database information is selected from information concerning the destination, origin, identification (e.g. name, address) of owner, travel history of bag and owner, and historical characteristics of the aforesaid travel bag. The aforesaid RF travel bag tag further comprises a first loop antenna, a transceiver operatively connected with the aforesaid first loop antenna and operable to receive an RF interrogation signal, at a low frequency not exceeding 15 MHz (e.g. 128 kHz), from a first reader and to transmit RF signals in response thereto, a microprocessor operable to control data flow between the aforesaid data storage device and the aforesaid transceiver in response to the aforesaid RF interrogation signal, and an energy storage device for providing energy to the aforesaid transceiver, data storage device, and microprocessor.

Advantageously, the aforesaid RF travel bag tag may further comprise a display (e.g. LCD) for displaying a selection of the aforesaid stored information upon carrying out interrogation step (b). Moreover, the aforesaid RF travel bag tag may further comprise an indicator device (e.g. an LED) operable to provide an indication (e.g. flashing light, buzzing sound) in response to interrogation of the aforesaid RF travel bag tag upon carrying out interrogation step (b) by using the aforesaid first RF interrogation signal.

The invention further provides a first level RF tag for use in a system for accessing information about a travel bag during shipment thereof, the aforesaid travel bag having attached thereto a travel bag RF tag as set forth hereinabove, the aforesaid travel bag being disposed at a first level repository (e.g. pallet/ULD), the aforesaid first level RF tag being associated with the aforesaid first level repository, the aforesaid first level RF tag comprising a first level data storage device operable to store first level information. The first level stored information comprises both first level identification information that identifies the aforesaid first level repository and the aforesaid travel bag disposed thereat and first level database information concerning characteristics of the aforesaid first level repository, the aforesaid first level database information being selected from information concerning the destination, origin, and historical characteristics of the aforesaid first level repository. The aforesaid first level RF tag further comprises a second loop antenna, a second transceiver operatively connected to the aforesaid second antenna and operable to receive a second RF interrogation signal at a low frequency not exceeding 15 MHz (e.g. 128 kHz) from a second reader and to transmit RF signals in response thereto, a first level microprocessor operable to control data flow between the aforesaid first level data storage device and the aforesaid second transceiver in response to the aforesaid second RF interrogation signal, and an energy source (e.g. battery, solar cell, transponder, directly connected external power) for providing energy to the aforesaid second transceiver, the first level data storage device, and first level microprocessor; the aforesaid second reader being operable for interrogating the aforesaid first level RF tag with said second interrogation signal to obtain the aforesaid first level stored information.

The invention also provides a higher level RF tag for use in a system for accessing information about a travel bag during shipment thereof, the aforesaid travel bag being disposed at a first level repository (e.g. pallet/ULD), the aforesaid first level repository comprising a first level RF tag as set forth hereinabove, the aforesaid first level repository being disposed at a higher level repository (e.g. airplane, warehouse baggage room), the aforesaid higher level RF tag being associated with the aforesaid higher level repository. The aforesaid higher level RF tag serves as said second reader and comprising a higher level data storage device operable to store higher level information, the stored higher level information comprising both identification information (that identifies the aforesaid higher level repository (e.g. airplane), the aforesaid first level repository (e.g. ULD) stored thereat and database information concerning characteristics of the aforesaid higher level repository, the aforesaid database information being selected from information concerning the destination, origin, and historical characteristics of the aforesaid higher level repository (e.g. flight plan and recent flights by airplane). The aforesaid higher level RF tag further comprises a third loop antenna, a third transceiver operatively connected to the aforesaid third loop antenna and operable to transmit the aforesaid second RF interrogation signal at the aforesaid low frequency (e.g. 128 kHz) to the aforesaid first level RF tag, a higher level microprocessor operable to control data flow between the aforesaid higher level data storage device and the aforesaid third transceiver, and an energy source (e.g. battery, solar cell, transponder, directly connected external power) for providing energy to the aforesaid third transceiver, higher level data storage device, and higher level microprocessor.

The invention also provides a travel bag operable for communicating wireless radio frequency (RF) signals, the aforesaid travel bag comprising an antenna integrated therewith. Preferably, the antenna is a loop (e.g. a ferrite loop) embedded into the travel bag during manufacture thereof, and has a dimension thereof that is substantially as large as a dimension of said travel bag. The large dimension of the loop enhances the signal strength it detects, which is at a frequency not exceeding 15 MHz (e.g. 128 kHz).

Preferably, the aforesaid travel bag further comprises an active RFID tag integrated therewith, the aforesaid RFID tag comprising a transceiver operable to transmit wireless RF signals through the aforesaid integrated antenna. Preferably, the travel bag comprises an energy storage device (e.g. battery or solar cell) integrated therewith and operable to energize said RFID tag.

According to another embodiment, the aforesaid travel bag further comprises an active RFID tag attached thereto (e.g. integrated therewith), the aforesaid RFID tag comprising a transceiver, a tag antenna operable to transmit wireless RF signals to the aforesaid integrated antenna, a microprocessor, a data storage device for storing identification and pedigree data, and an energy storage device for energizing the aforesaid RFID tag.

Preferably, the aforesaid RFID tag is active and further comprising a transceiver, a microprocessor, a data storage device operable to store a selected code (e.g. an ID code to identify the aforesaid travel bag or said product), and an energy storage device operable to energize the aforesaid RFID tag, the aforesaid tag antenna being operable to receive incoming wireless RF signals from the aforesaid integrated antenna and to communicate them to said transceiver, said transceiver being operable to communicate them to the aforesaid microprocessor, the aforesaid microprocessor being operable to read the aforesaid selected code (e.g. the aforesaid ID code) from the aforesaid data storage device in response to a selected set of aforesaid incoming wireless RF signals and to transmit the aforesaid selected code wirelessly from the aforesaid tag antenna to the aforesaid integrated antenna, the aforesaid integrated antenna being operable thereupon to transmit said ID code wirelessly to a field antenna of a reader.

Preferably, this novel travel bag comprises a loop antenna integrated into the travel bag in each of two substantially orthogonal dimensions thereof, and is designed for superior strength of signal reception by having dimensions thereof scaled to dimensions of the aforesaid travel bag.

The present application also provides a method, system and RFID tag for determining whether a repository, which includes a plurality of travel bags each bearing an RFID tag, includes an unrecorded travel bag which is not known to be present at the repository. The aforesaid method comprises the steps of:

a) transmitting an interrogation signal corresponding to an identity code of each travel bag that is known to be present at the repository, the aforesaid interrogation signal being operable to evoke a confirmatory response signal operable to confirm the presence of a travel bag bearing an RFID tag which stores said identity code, and b) programming each of the aforesaid RFID tags to automatically emit a volunteer stowaway signal only in the event that the RFID tag has not emitted an aforesaid confirmatory response signal within a selected period of time. Preferably, each RFID tag is made operable to emit the aforesaid stowaway signal upon transmission thereto of a selected interrogation signal, which can correspond to an identity code that does not match an identity code of any RFID tag borne by any travel bag on said repository.

Broadly, for such simplified polling to identify unknown/unrecorded "stowaways", the invention provides an RFID tag borne by each travel bag present at a repository, the aforesaid RFID tag comprising: a) a storage device operable to store the identification (ID) code of the RFID tag, and b) an RF transceiver operable to acknowledge receipt of an interrogation signal corresponding to the aforesaid ID code, the RF transceiver being operable to automatically emit a stowaway signal unless the corresponding RFID tag has received an interrogation signal corresponding to its ID code within a selected period of time, such stowaway signal being used as an indication that the travel bag is not known to be present at said repository.

According to one embodiment, the aforesaid stowaway signal is emitted upon receiving a selected interrogation signal. Moreover, the selected interrogation signal may typically correspond to an identity code that does not match an identity code of any RFID tag borne by any travel bag at said repository.

The invention also provides a system for determining whether a repository, which includes a plurality of travel bags each bearing an RFID tag, contains an unrecorded travel bag which is not known to be present at said repository. This system comprises:

a) a reader operable to transmit an interrogation signal corresponding to an identity code of each RFID tag that is known to be present at the aforesaid repository, b) a storage device within each of the aforesaid RFID tags for storing an identity code thereof, c) a transceiver within each of the RFID tags, the transceiver being operable to transmit a confirmatory response signal in response to the interrogation signal whenever the interrogation signal corresponds to an identity code stored in the storage device of the RFID tag being read, for confirming the presence of a travel bag bearing an RFID tag which stores that identity code, the transceiver being operable to transmit automatically a volunteer stowaway signal only in the event that the transceiver has not emitted a said confirmatory response signal within a selected period of time.

Preferably again, each aforesaid transceiver is operable to transmit the aforesaid stowaway signal upon transmission thereto of a selected interrogation signal. This selected interrogation signal preferably corresponds to an identity code that does not match an identity code of any RFID tag borne by any travel bag at the repository.

BRIEF DESCRIPTION OF THE DRAWINGS

The invention will be described with respect to a drawing in several figures.

DETAILED DESCRIPTION OF EMBODIMENTS OF THE INVENTION

Figure 1:
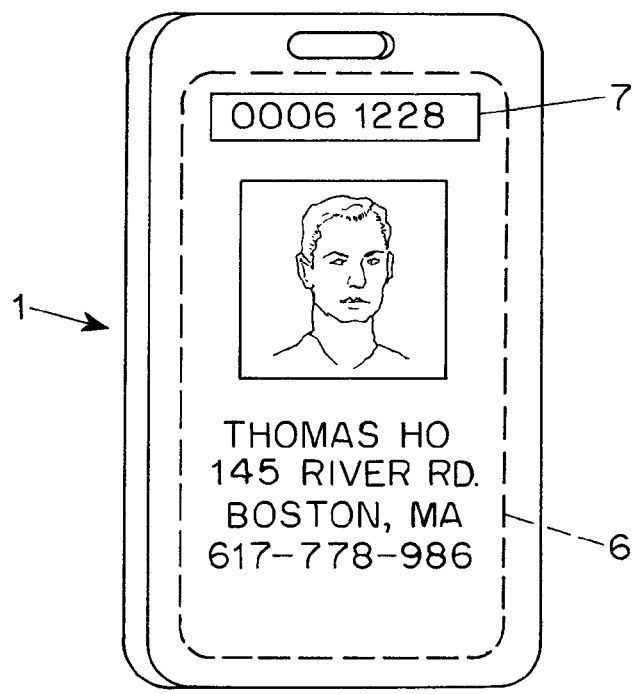
FIG. 1 is schematic view of an active RF travel bag tag according to the present invention.

In FIG. 1, the basic RF travel bag tag 1 includes an optional liquid crystal display (LCD) 7. The LCD may be used to indicate the identifying number of the travel bag to which the tag is attached to permit simple visual inspection of the LCD 7. The tag may also be provided with a buzzer or LEDs, may be used for picking and putting specific travel bags off a pallet truck, ULD, or the like-as by sending a RF wireless signal with the tag identification code to cause the tag 1 with the specified ID code to reveal its identity by illuminating its LED.

Figure 2:
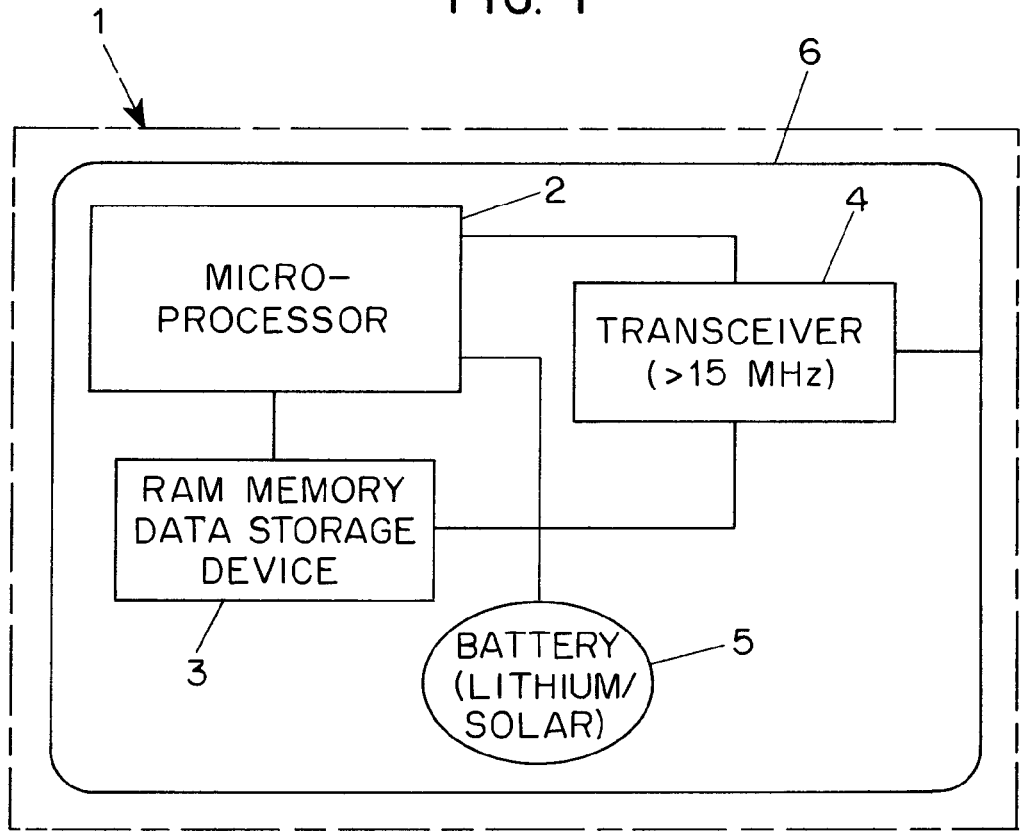
FIG. 2 is a schematic view of the components of the active RF travel bag tag shown in FIG. 1.

As shown in FIG. 2, tag 1 includes a microprocessor 2, a RAM memory data storage device 3, an RF transceiver 4 that allows tag 1 to communicate wirelessly using very low radio frequency (RF), and a data storage device in the form of a lithium battery 5 for powering of all these components of the active RF travel bag tag 1. According to the present invention, this RF transceiver 4 utilizes a low-frequency of less than 15 MHz, and preferably below 1 MHz (e.g. 128 kHz) together with a loop antenna 6, which provides immunity from interference and signal blocking in harsh environments that may be caused at higher RF frequencies by nearby steel structures and metal travel bags.

The present invention thus provides a novel low cost active RF tag 1 that works at very low frequencies and may be called the "t-Tag". The t-Tag has many advantages over known passive high frequency tags and active high frequency tags:

(1) Long batterylife (10-15 years). It is well known that most other active tags (which operate at high frequencies, such as 100 MHz) have two year battery life with large heavy duty batteries.

(2) Low cost. t-Tags can currently be manufactured in small quantities for as little as $1.50. In high volumes and with extra memory and displays, their costs rise to $4.00-$5.00. It should be noted, for comparison purposes, that active high frequency tags often cost from $50-$125.

(3) Small Credit Card Size for t-Tags. By comparison, known high frequency active tags can be of the size of a video tape cartridge.

(4) t-Tags are long-range and networkable. Many thousands of t-tags can be read within a loop antenna area (e.g. 50 feet in average diameter) without human intervention. The t-Tag is thus suitable for real time inventory tracking of luggage bags on a shelf in a holding area, or even within a baggage storage area of an aircraft. Such long-range networking is not possible with known high frequency passive tags.

(5) Harsh environment friendly. The novel t-Tags will work around steel and liquids in contrast to known high frequency tags. Such operation is not possible with known passive tags and high frequency active tags.

(6) t-Tags are "smart" They can have a full programmable microprocessor on-board as well as read write memory (e.g. up to 32K RAM).

Moreover, t-Tags are especially attractive for use, not only on luggage bags, but also in medical, military and other commercial applications on high valued, pedigree-critical assets.

The Reusable Smart Luggage Tag

As will therefore be understood, a t-Tag is a low cost, smart, active tag that can be permanently attached to a travelers bag in the same manner as any permanent luggage tag would be attached to a bag. The t-Tag would carry the full pedigree of the bag and of its owner, which would be stored only within the t-Tag itself. This pedigree would typically include the owner's name, address, and the like, along with a full history of the bag, (e.g. where the bag has been in last year). In addition, a service can then be provided to offer real-time online information about bag location as it travels through the airline system, along with the pedigree of the bag. The t-Tags are readable from a distance, or by low-cost, handheld PDA-like readers anywhere within the airline system. They also may be read with a large loop antenna within a physical storage area, or on the aircraft. Thus, a real time inventory of t-Tags in these locations can be done without any manual human intervention.

Thus, since the tags would be readable in a holding area as well as in the belly of a plane, it is easy to locate a bag if a passenger did not actually board. Additionally, status, location, and other information associated with the transport of the bag would be available online to the passenger, to the Airline, and to security organizations such as TSA. The full pedigree of the bag, i.e. owner, address, phone number, special travel status, full history of the bag, previous security checks, and any other relevant information is stored in the tag's memory directly. Thus, this useful data can be obtained without the need to access remote databases, which may be unavailable when the information is needed (e.g. to make security-related decisions about airline baggage). The t-Tag can be attached to the outside of the travel bag, or it may be placed inside its pocket and will still be readable by a loop antenna.

Each t-Tag would currently cost on the order of $1.50 to manufacture and is not intended to be disposable; it can be re-used many thousands of times. The advantages of maintaining a full bag pedigree, with minimal new IT, and the ability to read the bags with automated systems in the belly of the plane or on the floor of an airport are obvious. Another major advantage is that the novel tags are totally reusable for the life of the bag and as a result will have a much lower net cost per use going forward. This low cost is, of course, based upon widespread use in penetration of the tag by the airlines and by travelers.

Travelers would also obtain several benefits including availability of on-line tracking of bags, improved bag identity, and the advantage that the same tags may optionally also be used to provide airlines, casinos, airport clubs, hotels with identity information as well as preferences (e.g. drinks, meals, window seats, aisle seats, spouse's name, and the like).

A Sample Pedigree in a t-Tag
Thomas Ho
Born Dec. 1, 1973, Boulder Colo.
Freq Travel Program ID 456673321
145 River Road
Boston Mass.
617-778-9867
617-668-9999 Cell
Emp Visible Assets Inc. 4 years
Previous Address Jul. 23, 2001
114 Store Street
Atlanta, Ga.
Bag Pedigree
Sep. 1, 2004
12:33 checked BOS—ATL
12:45 post 23 BOS
12:47 post 34 BOS
Flight 3476 AA ATL
14:33 3476 M ATL
14:45 post 23 ATL
14:47 post 45 ATL
14:49 belt 23 ATL
14:54 removed belt 23
Aug. 6, 2004
12:22 checked BOS—ATL
12:35 post 23 BOS
12:37 post 34 BOS
TSA Checked (ID 3456) opened OK
Flight 3476 AA ATL
14:13 3476 AA ATL
14:27 post 23 ATL
14:48 post 45 ATL
14:59 belt 23 ATL
15:04 removed belt 23
Jul. 23, 2004
12:22 checked BOS—YYZ
12:35 post 23 BOS
12:37 post 34 BOS
Flight 3477 AA YYZ
14:13 3477 AA YYZ
14:27 post 23 YYZ
14:48 post 45 YYZ
14:67 CDN customs (ID 44567) Opened OK
14:59 belt 23 ATL
15:04 removed belt 23

For auditing purposes, the evolving bag pedigree data may be tracked in real-time and immediately stored on a RO (write-once-only) CD (compact disc), which may be located nearby or at a remote, secure facility (e.g. of the TSA), to thereby create a fully archived, independent audit trail of the pedigree and the bag.

In practice, such t-Tags may be sold directly to the customer by the airlines at a modest markup. They may be marketed in a manner similar to the permanent identity tags now required by all airlines in order to check a bag (which now have the owner's name, address, and home phone number, etc. printed on the label). The traveler can then also be given access (for a modest fee) to a web enabled online report that would provide the complete tracking history pedigree of the traveler's bag. Initial consumer interviews suggest that most consumers would be willing to pay for such a service simply to insure that their bag is not lost, and if it is lost, that it could be quickly found and returned with online information available to the consumer.

For this purpose, readers (large loops or handheld PDA's) can be placed at strategic locations to provide information back to the consumer. For example, a business traveler with a WAP-enabled cell phone could log on to a tracking site while sitting on the plane before it is ready to take off and thereby confirm that his/her bag has actually been loaded onto the plane. If, on the other hand, a bag does not actually get loaded on a plane, the consumer can logon to the website and locate it within the network. This advantageous capability alone would save many millions of dollars and improve customer relations for the airlines, while providing customers with a high comfort level that their bags are safe.

Of course, the online software and web sites and related services to enable consumer access would also be provided back to the airlines (for a fee) and to the TSA.

Moreover, the permanent t-Tags would be sold by the airlines directly to the traveler as a replacement for the existing permanent ID tags that are now attached to the baggage.

The Smart t-Bag

Moreover, baggage manufacturers can directly place the t-Tag's circuitry directly into newly created luggage, to thereby form part of the bag itself. These "smart" bags can be provided with additional tag memory, larger (and thus more sensitive) antennas, and can thus effectively provide the traveler with a permanent bag pedigree. For this purpose, simple PC-based software can be provided along with the customized bag as part of the package that would allow the tag memory to be read and modified by the traveler. Of course, suitable security features (acceptable to both the TSA and the airlines) would be provided in order to provide assurance that the pedigree is accurate and true. For audit purposes, periodic transmission of pedigree data to a remote write-once-only CD storage device can ensure that pedigree data have not been changed.

The Current Passive Tag Sortation Programs vs t-Tag

Finally the t-Tag system provides significant direct and measurable value to the key players in air travel:
(1) The Traveler. On-line real time reports with positive luggage ID at a low cost.
(2) The Airline. Online reports with luggage ID, plus full bag pedigree in holding areas, on conveyance, as well as optionally in the aircraft itself.
(3) Security Officials. Online reports and data at the bag itself (no need to read database) providing full bag pedigree as well as ability to provide audits of checks and bag openings.

(4) Airport Clubs and Hotels. Name, address, and other preferences.

These benefits cannot be provided with a known passive barcode tag system.

The t-tag 1 could be used for check-in very easily. This would replace expensive paper scanners at the gate kiosk for check-in and make it possible to read and write to these tags throughout the travel chain, a low cost with high security.

If, for example, a traveler walks up to a special pad at the Northwest Airline check-in counter, takes his active, low-frequency RF t-tag that he has in his briefcase, and puts it near the check-in RF tag, the check-in tag could read his name, address and other details as well as any other of the information, including any security information required. Check the bag and write a digital signature back to the tag. The tag can also display on its LCD the flight number, gate number, time of departure and date so that the traveler can see where he's going and what has happened.

The traveler then can go to the TSA security line, where the official looks at his ID (e.g. passport) and looks at the t-tag LCD display to see that the traveler has a valid date and a valid flight.

After initial ID clearance by the TSA official, the traveler goes to the x-ray machine and again the t-tag is read, and the bag is cleared by TSA with an entry into the data log of the memory 3 of the t-tag 1 as part of the pedigree. The bag comes out the other side cleared, is picked up by the traveler, who proceeds to the gate where the t-tag 1 can be read again, thereby replacing the large, expensive machines now in place that read bar codes before entry onto the plane.

Again our novel t-tag 1 can add to the pedigree log/memory 3, the log-in dates and times, and the LCD display can now show my seat number. The result is a truly paperless travel system and we have replaced expensive readers with low-cost readers such as reader 16 (FIG. 7) at every single check-point, and we have a low-cost tag 1 that has the full traveler's pedigree built into its memory 3.

Moreover, additional layers of security can be added by providing a keypad on the tag based on our earlier disclosures relating to a security card with such a keypad to open door-locks.

Figure 3:
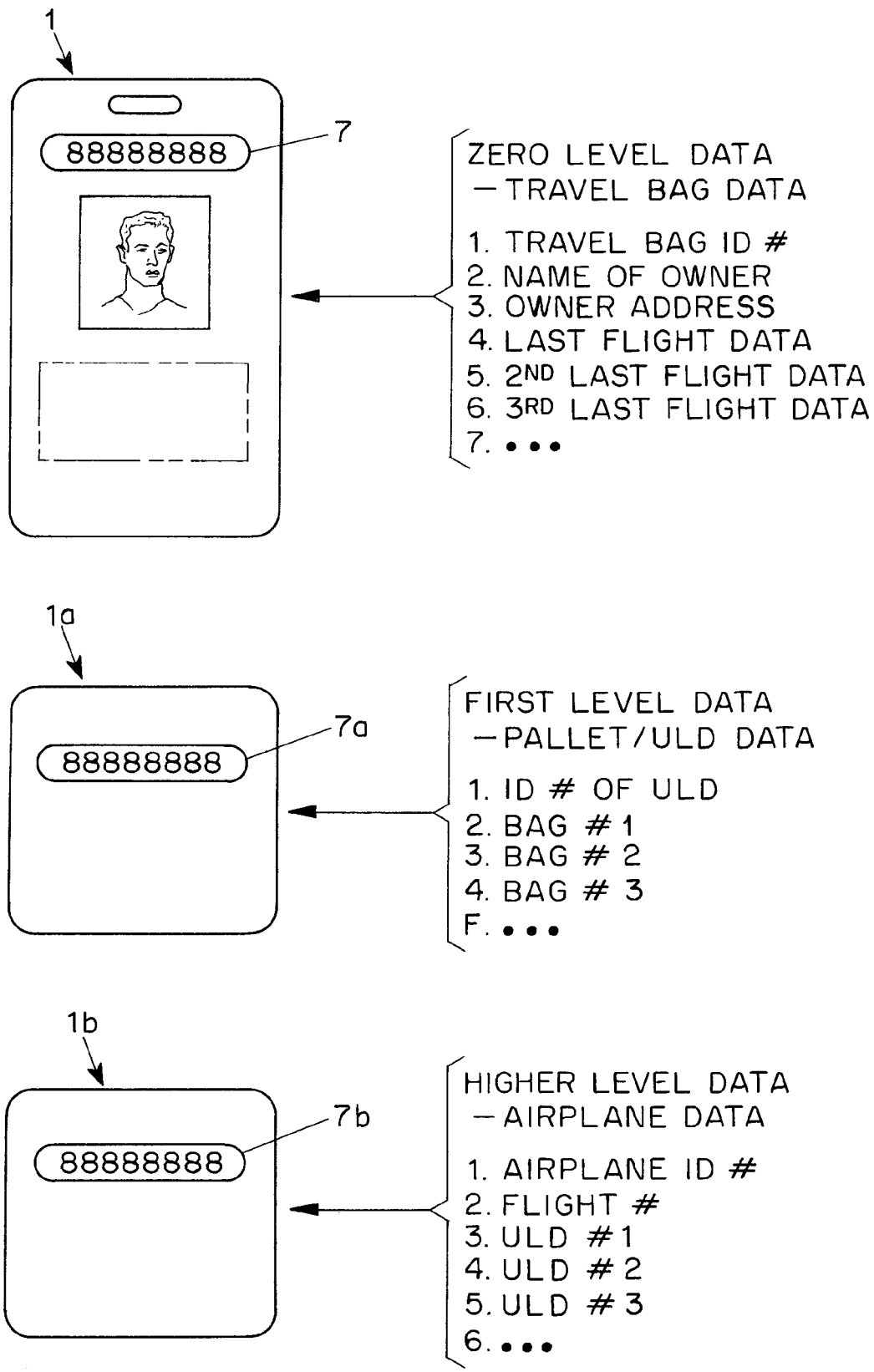
FIG. 3 is a schematic view of an active RF travel bag tag of FIG. 1, a first level RF tag (e.g. for a pallet or ULD), and a higher level tag (e.g. for an airplane or airport baggage area), together with a depiction of the nested database data respectively stored on these three tags.
Figure 5:
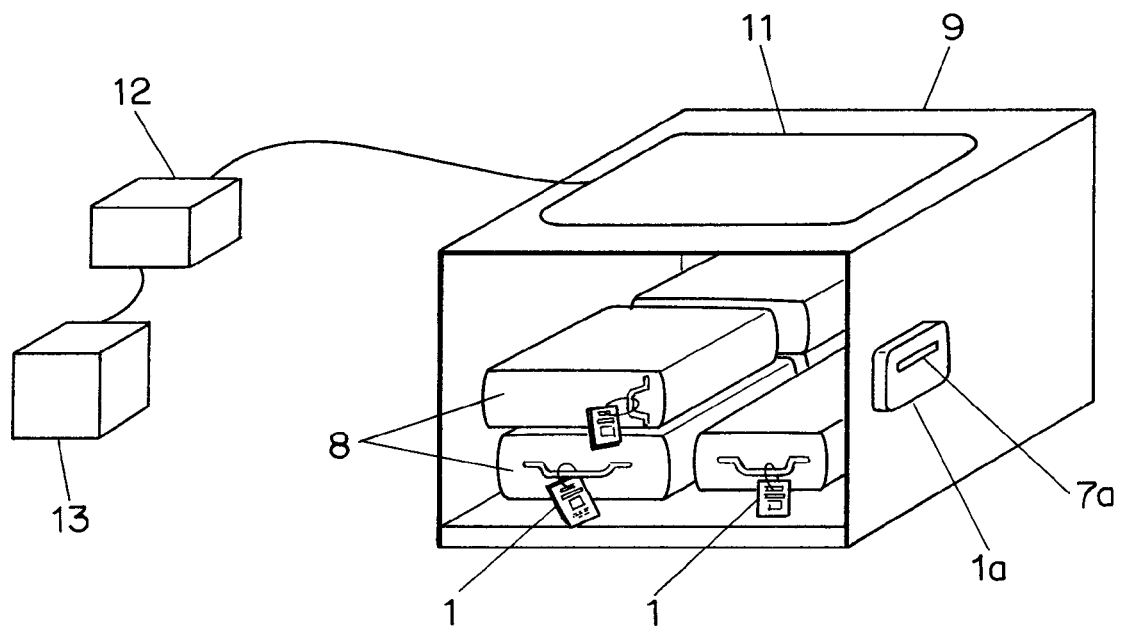
FIG. 5 is a schematic perspective view of novel system including a ULD (Unit Load Device) with travel bags therein.

In our SQL approach (as illustrated in FIG. 3), low cost travel bag tags 1 can be placed on the individual travel bags 8, which may be placed on a pallet or ULD 9 (as in FIG. 5). These "zero level" tags 1 may store in its memory 3, a travel bag ID number for display on LCD 7, together with the bag owner's name and address, and a pedigree of the bag's history, such as its recent flight history.

Then, a first level SQL tag 1*a*, with memory, display, is placed on the outside or inside of each pallet or ULD 9 (or "first-level repository") which itself contains a number of individual travel bags 8 with the foregoing travel bag tags 1 attached. The first level SQL tag 1*a* on the ULD 9 would have stored (in its memory) its own ULD identification number as well as the IDs of all the travel bags 8 contained in the box. The SQL tag 1*a* on the ULD 9 may also have its RAM memory or other storage device updated as it goes through the airport baggage room to the baggage hold area of a higher level repository, such as an airplane (e.g. 14 in FIG. 6), and may be read in real-time as the ULD 9 ("first level repository") moves. For powering its microprocessor, transceiver and other components, each ULD tag 1*a* has an energy source, which may be an energy storage device (such as a battery or solar cell) or a transponder coil device energizable by RF energy from an interrogating reader (such as reader 16 in FIG. 7, where a ULD 9 and ULD tag 1*a* can be viewed in place of travel bag 8 and travel bag tag 1, respectively).

In addition, each airplane 14 ( as a "higher level repository") contains a higher level SQL tag 1*b* that has stored, in its memory, its own ID number and the ID numbers of all ULDs 9 that the airplane 14 holds. Again these higher level tags 1*b* have a memory, transceiver, display, and other necessary high-capability components. For powering its microprocessor, transceiver and other components, each higher level (e.g. airplane) tag 1*b* has an energy source, which may be an energy storage device (such as a battery or solar cell) or a transponder coil device energizable by RF energy from an interrogating reader (such as reader 16 in FIG. 7, where an airplane 14 and airplane tag 1*b* can be viewed in place of travel bag 8 and travel bag tag 1, respectively).

As a result, a reader can read each higher level pallet SQL tag 1*b* to quickly obtain the ID numbers of all first level ULD tags 1*a*. In the standard protocol, the reader would ask each first level package SQL tag 1*a* with a specific ID to respond or chirp back. This simply confirms that each responding ULD tag 1*a* is actually present on the pallet. Once all the ULD SQL tags 1*a* have been confirmed, the reader would then read the travel bag ID numbers contained in each first level ULD SQL tag 1*a* at the travel bag level, and could interrogate, one by one, the memory 3 of each individual travel bag tag 1. This systematic "bed check" would confirm that all travel bags that are supposed to be contained on the pallet are contained. In this way, one can effectively carry out a fairly complete and rapid physical inventory.

With this hierarchy it is possible, with a wireless tag reader 16, and with no prior information, to go into a baggage hold area of an airplane 14 and read virtually everything that is supposed to be present and confirm that the travel bags 8 on the airplane actually match what was ordered, or whether extra travel bags 8, that have RF SQL tags 1, have been added.

As will be understood, the RF SQL system thus provides full data about travel baggage in a nested hierarchical manner, with no prior knowledge. It thus enables tracking of travel bags with no prior knowledge throughout the supply chain, as depicted in FIG. 3.

In prior art systems proposed for supply chains and tracking, the standard travel tags have barcode IDs which are fixed at the time of identification (e.g. name, address of owner, destination, and origin of flight), and thereafter move through the supply chain attached to the bags. At each stop along the shipment chain, these barcode ID tags may be read so that the IDs are identified and then a database with all the pertinent information must be interrogated. This has the disadvantage of having to acquire external data while flowing through the supply chain, through corresponding access to database information. As will be understood, according to the prior art, the barcode tag IDs are interrogated one travel bag at a time and the data for each ID must be available from an external database at each stop to identify or understand the freight travel bag, its destination, and other pertinent information. In addition, this fixed ID system requires complex communication schemes to read many tags on one pallet or ULD since the IDs of the tags may not be known in advance. This multiplexing issue leads to additional expense and complexity of the entire process as well as in systems throughout the supply chain.

By contrast, the RF SQL tags of the present invention can provide all information about the object, pallet, vessel, truck or other repository to which they are attached, respectively. Thus, with a very inexpensive reader 16 (see FIG. 7 ), and with no prior knowledge of IDs or other data, all pertinent pedigree and ID information may be determined easily and directly from the RF SQL tags 1, 1*a*, and 1*b*. A handheld reader 16, that is capable of reading all information by interrogating a second level tag for example, may currently cost under $50. Once the higher level airplane tag 1*b* is thus interrogated and information loaded into the handheld 16 it is possible for a person to quickly locate the pallet/ULD 9 that contains a specific travel bag 8 via the illumination of LEDs or display of LCDs of zero level travel bag RF SQL tags 1 on bags 8 carried on that ULD 9. Therefore the RF SQL tag herein reflects a portable electronic hierarchy of data and information that makes possible a duplex peer-to-peer poll-based system. As will be understood, each (zero level) travel bag RF SQL tag 1, each (first level) pallet RF SQL tag 1a, and each (higher level) airplane/warehouse RF SQL tag 1b may have a unique internet IP address which will allow any internet-connected computer or system to quickly detect and confirm virtually any piece of data regarding the movement of the freight, and to readily access that information from anywhere via the internet.

Figure 4:
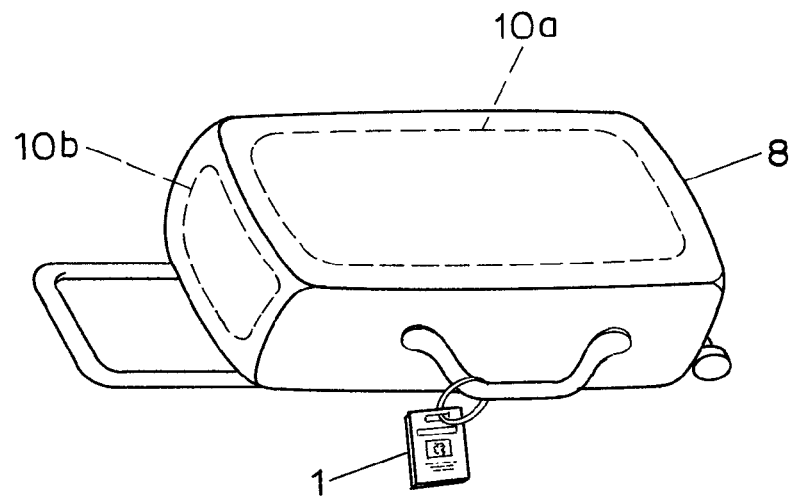
FIG. 4 is a schematic perspective view of a travel bag according to the invention, with a loop antenna integrated therein.
Figure 6:
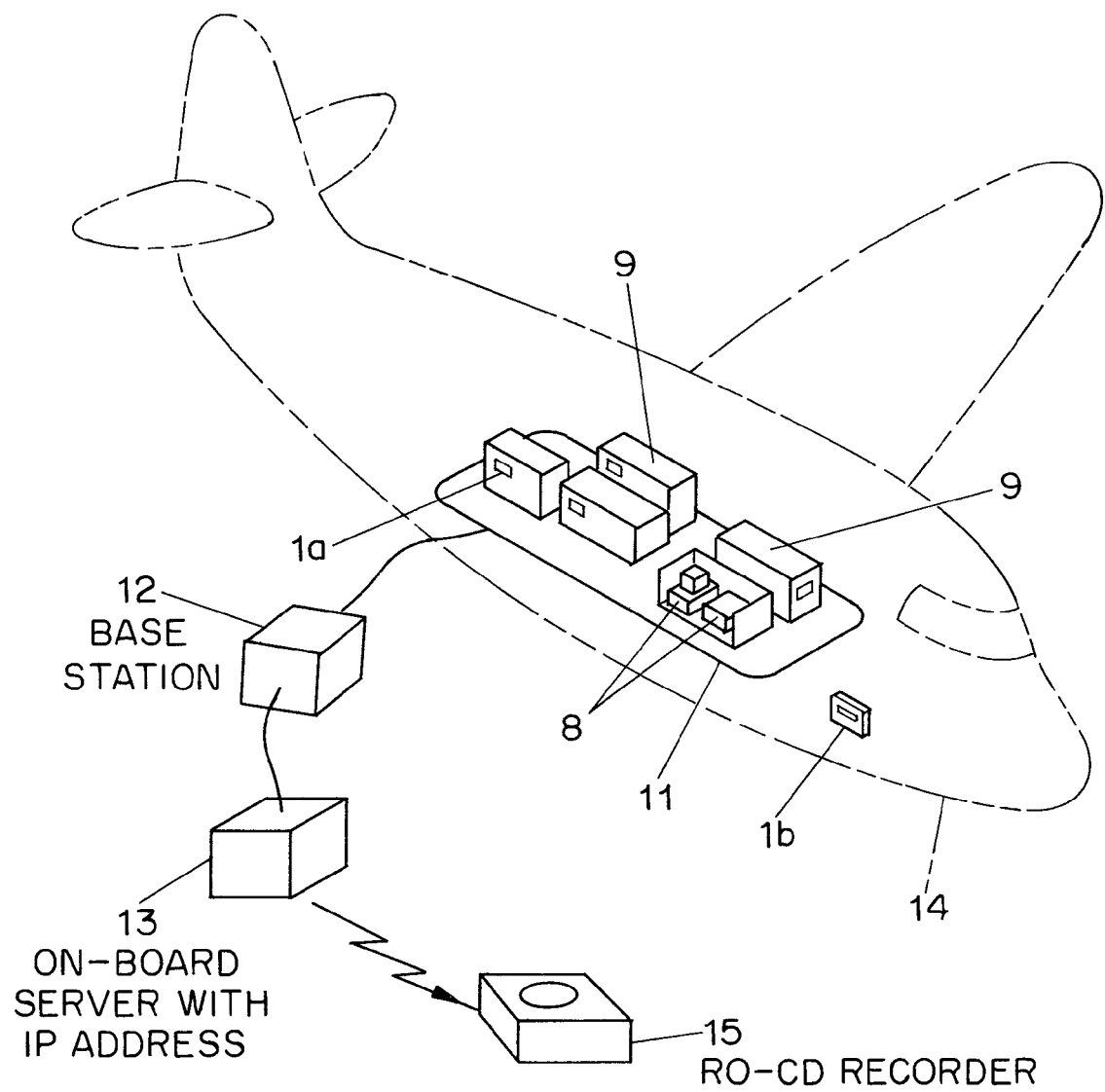
FIG. 6 is a schematic perspective view of a novel system including a higher level repository, in the form of an airplane, with ULD's (Unit Load Devices) therein.
Figure 7:
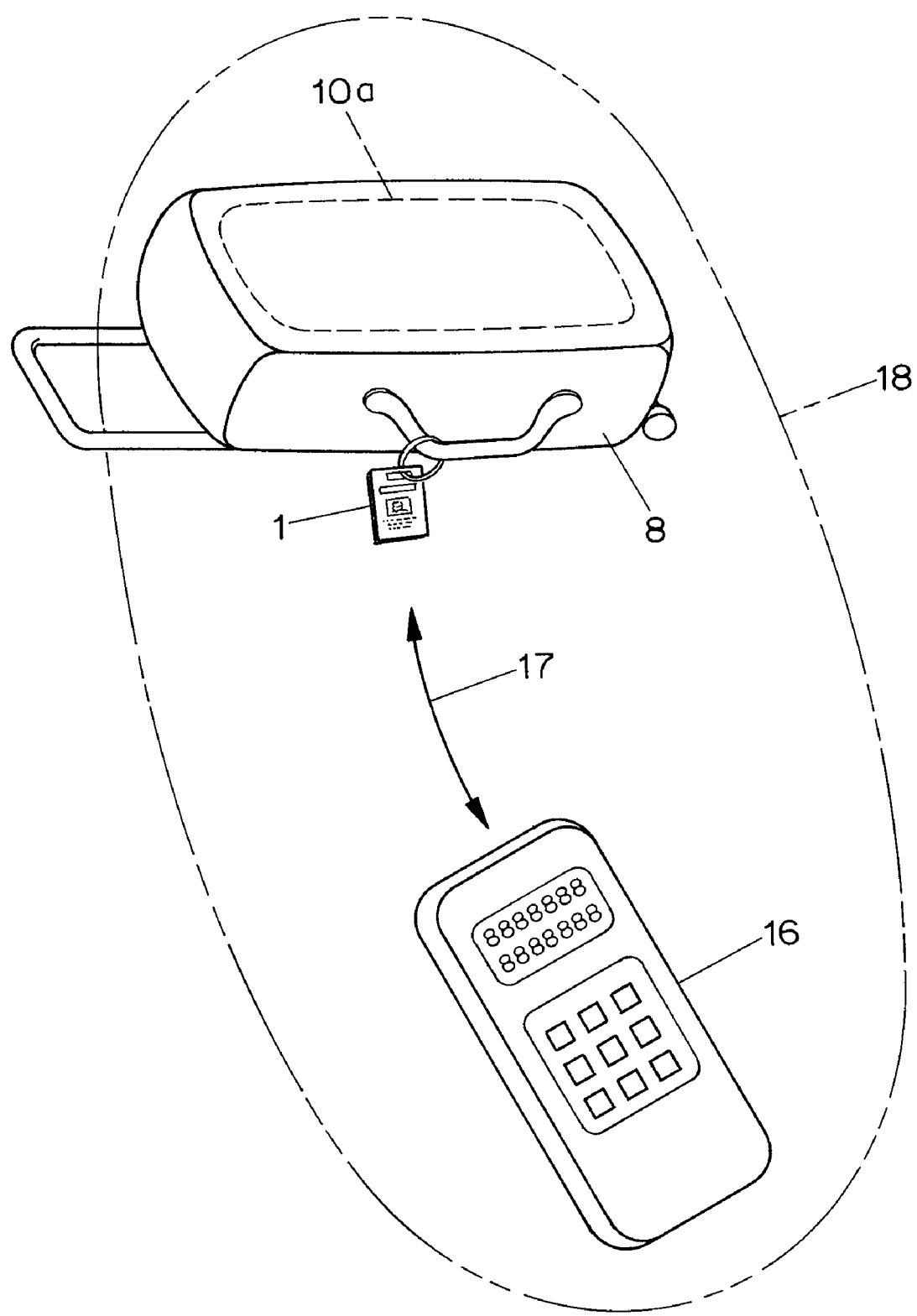
FIG. 7 is a schematic perspective view of a reader interrogating a tag attached to a novel travel bag that has a loop antenna integrated therewith.

FIGS. 4-6 show the hierarchical sequence of zero level RF SQL tag 1 on the individual bag, a level one RF SQL tag 1a on a pallet/ULD 9 containing a number of travel bags 8, and a higher level RF SQL tag 1b in an airplane containing a number of pallets. In an airplane (FIG. 6), reading of tags with hierarchically nested information on bags (level zero) and pallets (level 1) and trucks (level 2) can be done by embedded large loop antennas 11 which are tunable to low frequencies (e.g. less than 300 kHz). To serve as a reader of hierarchical information on the products and pallets of FIGS. 5, 6, base station 12 is connected to loop antennas 11 and to server 13 (which can be provided with an IP address for communicating the information read from the tags onward via the internet). Of course, as illustrated in FIG. 7, reading of information from RF SQL tags 1 on bags 8 as well as RF SQL tags 1a and 1b of any level can be done by handheld readers 16 held for transmission/receiving communication 17 within the range 18 of the reader 16. As shown in FIG. 7, bag 8 has an integrated loop antenna 10a which ensures superior signal strength, due to its size, while its tag 1 communicates with antenna 10a by either direct hardwired connection or wirelessly from a small antenna located within tag 1.

Furthermore, a novel polling method is provided herein to also determine whether there are any unexpected "stowaway" travel bags present upon a pallet or other repository. For this purpose, each SQL travel bag tag is provided with a very simple feature that they will automatically volunteer a response (or respond to a selected standard ID of 00000, for example) unless they have been read/polled with their correct actual ID within the last selected period (e.g. one minute). If a simple SQL travel bag tag has been read with its actual correct ID within the last one minute, that specific SQL travel bag tag will remain silent. Thus, at the conclusion of the full inventory check of SQL tags at the travel bag level for the entire pallet, the reader can send out such a selected special signal/ID, thereby effectively asking whether there are any SQL travel bag tags contained on the pallet which have not been read within the last one minute. (Instead of using such a special signal, each SQL travel bag tag may instead be programmed to volunteer a response each minute unless it receives a signal with its correct actual ID.) If the reader hears a response signal, it indicates that at least one unidentified travel bag is contained on the pallet. In most cases simply knowing that such a "stowaway" travel bag is present somewhere on a pallet can be used to cause a simple physical inventory check of that pallet. Other methods can be used to eliminate the chirp response and possibly read the ID of the unknown tag. However, in most cases simply knowing that an extra travel bag, or even an extra package, is located on the pallet is sufficient information to remedy the error.

The above-disclosed system offers the advantage of a very simple, polled, low-cost, fixed ID solution that will work on many other travel bag-based schemes for packaging, tracking, storing, and locating travel bags.

Since changes and variations in details can be made in practicing the invention without departing from the spirit thereof, it is intended to include within the scope of the appended claims all such modifications as will be obvious to those skilled in the art of shipping and logistics therefor from the description given herein.

What is claimed is:

1. A method for accessing information about a travel bag during shipment thereof, said method comprising the steps of:
    a) associating a radio frequency (RF) travel bag tag with said travel bag, the aforesaid travel bag RF tag comprising a travel bag data storage device operable to store information, the stored information comprising both identification information that identifies said travel bag and an owner thereof and database information concerning characteristics of the travel bag, the aforesaid database information being selected from information concerning the destination, origin, travel history of bag, and historical characteristics of said travel bag, the aforesaid RF travel bag tag further comprising a first loop antenna, a transceiver operatively connected with said first antenna and operable to receive a first RF interrogation signal at a low frequency not exceeding 15 MHz from a first reader and to transmit RF signals in response thereto, a microprocessor operable to control data flow between said data storage device and said transceiver in response to said RF interrogation signal, and an energy storage device for providing energy to said transceiver, data storage device, and said microprocessor; and
    b) interrogating said RF travel bag tag with said first RF interrogation signal from said first reader to obtain said stored information
    and wherein said travel bag is disposed at a first level repository and said method further comprises the steps of associating a first level RF tag with said first level repository, said first level RF tag comprising a first level data storage device operable to store first level information, the first level stored information comprising both first level identification information that identifies said first level repository and said travel bag disposed thereat and first level database information concerning characteristics of said first level repository, said first level database information being selected from information concerning the destination, origin, and historical characteristics of said first level repository, said first level RF tag further comprising a second loop antenna, a second transceiver operatively connected to said second antenna and operable to receive a second RF interrogation signal at a low frequency not exceeding 15 MHz from second reader and to transmit RF signals in response thereto, a first level microprocessor operable to control data flow between said first level data storage device and said second transceiver in response to said second RF interrogation signal, and an energy source for providing energy to said second transceiver, first level data storage device, and said first level microprocessor; and interrogating said first level RF tag with said second interrogation signal from said first reader to obtain said first level stored information.

2. A method as set forth in claim 1, said RF travel bag tag further comprising a display for displaying a selection of said stored information upon carrying out interrogation step (b).

3. A method as set forth in claim 1, said RF travel bag tag further comprising an indicator device operable to provide an indication in response to interrogation of said RF travel bag tag upon carrying out interrogation step (b) by using said first RF interrogation signal.

4. A method as set forth in claim 1, said travel bag being disposed at a first level repository, said first level repository being disposed at a higher level repository, said method further comprising a step of associating a higher level RF tag with said higher level repository, said higher level RF tag serving as said second reader and comprising a higher level data storage device operable to store higher level information, the stored higher level information comprising both identification information that identifies said higher level repository and said first level repository stored thereat and database information concerning characteristics of said higher level repository, said database information being selected from information concerning the destination, origin, and historical characteristics of said higher level repository, said higher level RF tag further comprising a third loop antenna, a third transceiver operatively connected to said third loop antenna and operable to transmit said second RF interrogation signal at said low frequency to said first level RF tag, a higher level microprocessor operable to control data flow between said higher level data storage device and said third, and an energy source for providing energy to said third transceiver, higher level data storage device, and said higher level microprocessor.

5. A method as set forth in claim 1, said second reader being in operative communication with a central monitoring station.

6. A method as set forth in claim 5, further comprising the step of
c) transmitting said RF signals from said transceiver at step (a) to a central monitoring station for auditable recording thereat.

7. A method as set forth in claim 1, further comprising the step of
c) transmitting said RF signals from said transceiver at step (a) to a central monitoring station for auditable recording thereat.

8. A system for accessing information about a travel bag during shipment thereof wherein said travel bag is disposed at a first level repository, said system comprising:
a) a radio frequency (RF) travel bag tag associated with said travel bag, the aforesaid travel bag RF tag comprising a travel bag data storage device operable to store information, the stored information comprising both identification information that identifies said travel bag and an owner thereof and database information concerning characteristics of the travel bag, the aforesaid database information being selected from information concerning the destination, origin, travel history of bag, and historical characteristics of said travel bag, the aforesaid RF travel bag tag further comprising a first loop antenna, a transceiver operatively connected with said first antenna and operable to receive a first RF interrogation signal at a low frequency not exceeding 15 MHz from a first reader and to transmit RF signals in response thereto, a microprocessor operable to control data flow between said data storage device and said transceiver in response to said RF interrogation signal, and an energy storage device for providing energy to said transceiver, data storage device, and said microprocessor;
b) a said first reader interrogating said RF travel bag tag with said first RF interrogation signal to obtain said stored information
c) a first level RF tag being associated with said first level repository, said first level RF tag comprising a first level data storage device operable to store first level information, the first level stored information comprising both first level identification information that identifies said first level repository and said travel bag disposed thereat and first level database information concerning characteristics of said first level repository, said first level database information being selected from information concerning the destination, origin, and historical characteristics of said first level repository, said first level RF tag further comprising a second loop antenna, a second transceiver operatively connected to said second antenna and operable to receive a second RF interrogation signal at a low frequency not exceeding 15 MHz from second reader and to transmit RF signals in response thereto, a first level microprocessor operable to control data flow between said first level data storage device and said second transceiver in response to said second RF interrogation signal, and an energy source for providing energy to said second transceiver, first level data storage device, and said first level microprocessor; and
d) a said second reader operable for interrogating said first level RF tag with said second interrogation signal to obtain said first level stored information.

9. A system as set forth in claim 8, said RF travel bag tag further comprising a display for displaying a selection of said stored information upon carrying out interrogation step (b).

10. A method as set forth in claim 8, said RF travel bag tag further comprising an indicator device operable to provide an indication in response to interrogation of said RF travel bag tag upon carrying out interrogation step (b) by using said first RF interrogation signal.

11. A system as set forth in claim 8, said travel bag being disposed at a first level repository, said first level repository being disposed at a higher level repository, said system further comprising a higher level RF tag associated with said higher level repository, said higher level RF tag serving as said second reader and comprising a higher level data storage device operable to store higher level information, the stored higher level information comprising both identification information that identifies said higher level repository and said first level repository stored thereat and database information concerning characteristics of said higher level repository, said database information being selected from information concerning the destination, origin, and historical characteristics of said higher level repository, said higher level RF tag further comprising a third loop antenna, a third transceiver operatively connected to said third loop antenna and operable to transmit said second RF interrogation signal at said low frequency to said first level RF tag, a higher level microprocessor operable to control data flow between said higher level data storage device and said third, and an energy source for providing energy to said third transceiver, higher level data storage device, and said higher level microprocessor.

12. A system as set forth in claim 11, said second reader being in operative communication with a central monitoring station.

13. A first level RF tag for use in a system for accessing information about a travel bag during shipment thereof, said travel bag having attached thereto a travel bag RF tag comprising a data storage device operable to store information, the stored information comprising both identification information that identifies said travel bag and database information concerning characteristics of said travel bag, said database information being selected from information concerning the destination, origin, identification of owner, travel history of bag and owner, and historical characteristics of said travel bag, said RF travel bag tag further comprising a first loop antenna, a transceiver operatively connected with said first loop antenna and operable to receive an RF interrogation signal, at a low frequency not exceeding 15 MHz, from a first reader and to transmit RF signals in response thereto, a microprocessor operable to control data flow between said data storage device and said transceiver in response to said RF interrogation signal, and an energy storage device for providing energy to said transceiver, data storage device, and said microprocessor, said travel bag being disposed at a first level repository, said first level RF tag being associated with said first level repository, said first level RF tag comprising a first level data storage device operable to store first level information, the first level stored information comprising both first level identification information that identifies said first level repository and said travel bag disposed thereat and first level database information concerning characteristics of said first level repository, said first level database information being selected from information concerning the destination, origin, and historical characteristics of said first level repository, said first level RF tag further comprising a second loop antenna, a second transceiver operatively connected to said second antenna and operable to receive a second RF interrogation signal at a low frequency not exceeding 15 MHz from a second reader and to transmit RF signals in response thereto, a first level microprocessor operable to control data flow between said first level data storage device and said second transceiver in response to said second RF interrogation signal, and an energy source for providing energy to said second transceiver, first level data storage device, and said first level microprocessor; said second reader being operable for interrogating said first level RF tag with said second interrogation signal to obtain said first level stored information.

14. A higher level RF tag for use in a system for accessing information about a travel bag during shipment thereof said travel bag being disposed at a first level repository, said first level repository comprising a first level RF tag as set forth in claim 13, said first level repository being disposed at a higher level repository, said higher level RF tag associated with said higher level repository, said higher level RF tag serving as said second reader and comprising a higher level data storage device operable to store higher level information, the stored higher level information comprising both identification information that identifies said higher level repository, said first level repository stored thereat, and said travel bag stored at said first level repository and database information concerning characteristics of said higher level repository, said database information being selected from information concerning the destination, origin, and historical characteristics of said higher level repository, said higher level RF tag further comprising a third loop antenna, a third transceiver operatively connected to said third loop antenna and operable to transmit said second RF interrogation signal at said low frequency to said first level RF tag, a higher level microprocessor operable to control data flow between said higher level data storage device and said third, and an energy source for providing energy to said third transceiver, higher level data storage device, and said higher level microprocessor.

15. A tag as set forth in claim 13, said first and/or second reader being in operative communication with a central monitoring station.

16. A method of determining whether a repository, which includes a plurality of travel bags each bearing an RFID tag, includes an unrecorded travel bag which is not known to be present at said repository, said method comprising the steps of:
  a) transmitting an interrogation signal corresponding to an identity code of each travel bag that is known to be included at said repository, said interrogation signal being operable to evoke a confirmatory response signal operable to confirm the presence, in said repository, of a travel bag bearing an RFID tag which stores said identity code; and
  b) programming each of said RFID tags to automatically emit a volunteer stowaway signal only in the event that each of said RFID tags has not emitted said confirmatory response signal within a selected period of time.

17. A method as set forth in claim 16, wherein programming step (b) requires each of said RFID tags to emit said stowaway signal upon transmission thereto of a selected interrogation signal.

18. A method as set forth in claim 17, wherein said selected interrogation signal corresponds to an identity code that does not match an identity code of any RFID tag borne by any travel bag at said repository.

19. An RFID tag borne by each travel bag at a repository, said RFID tag comprising:
  a) a data storage device operable to store the identification (ID) code of said RFID tag, and
  b) an RF transceiver operable to acknowledge receipt of an interrogation signal corresponding to said ID code, said RF transceiver being operable to automatically emit a stowaway signal unless said RFID tag has received an interrogation signal corresponding to said ID code within a selected period of time, said stowaway signal being used as an indication that said travel bag is not known to be present at said repository.

20. An RFID tag as set forth in claim 19, wherein said stowaway signal is emitted upon receiving a selected interrogation signal.

21. An RFID tag as set forth in claim 20, wherein said selected interrogation signal corresponds to an identity code that does not match an identity code of any RFID tag borne by any travel bag at said repository.

22. A system for determining whether a repository, which includes a plurality of travel bags each bearing an RFID tag, contains an unrecorded travel bag which is not known to be present at said repository, said system comprising:
  a) a reader operable to transmit an interrogation signal corresponding to an identity code of each RFID tag that is known to be present at said repository,
  b) a data storage device within each of said RFID tags for storing an identity code thereof, and
  c) a transceiver within each of said RFID tags, said transceiver being operable to transmit a confirmatory response signal in response to said interrogation signal when said interrogation signal corresponds to an identity code stored in the storage device of each of said RFID tags, for confirming the presence of a travel bag bearing an RFID tag which stores said identity code, said transceiver being operable to transmit automatically a volunteer stowaway signal only in the event that said transceiver has not emitted said confirmatory response signal within a selected period of time, and an energy storage device operable to energize said transceiver.

23. A system as set forth in claim 22, wherein each said transceiver is operable to transmit said stowaway signal upon transmission thereto of a selected interrogation signal.

24. A system as set forth in claim 23, wherein said selected interrogation signal corresponds to an identity code that does not match an identity code of any RFID tag borne by any travel bag at said repository.

* * * * *

UNITED STATES PATENT AND TRADEMARK OFFICE
CERTIFICATE OF CORRECTION

| | | |
|---|---|---|
| PATENT NO. | : 7,626,505 B2 | Page 1 of 1 |
| APPLICATION NO. | : 11/162907 | |
| DATED | : December 1, 2009 | |
| INVENTOR(S) | : August et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Twenty-first Day of December, 2010

David J. Kappos
*Director of the United States Patent and Trademark Office*